April 7, 1970  E. W. KOCH ET AL  3,504,550
LIQUID SAMPLER
Filed April 15, 1968  2 Sheets-Sheet 1
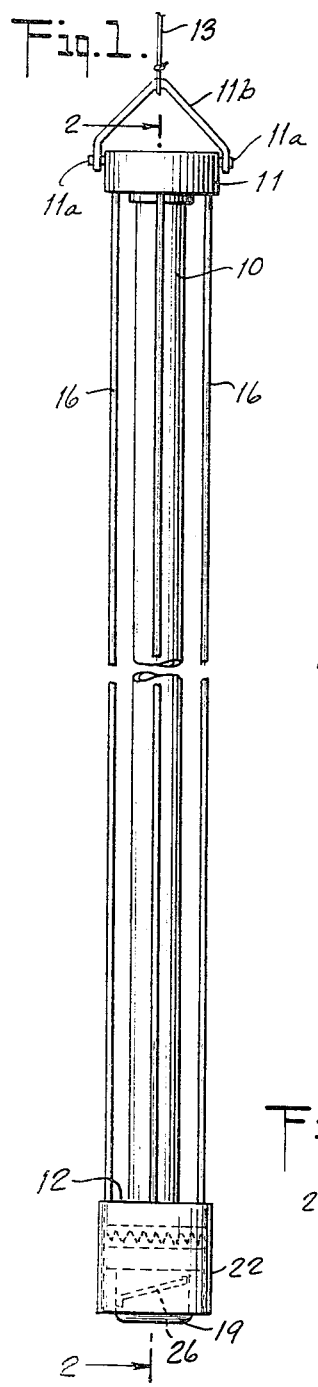
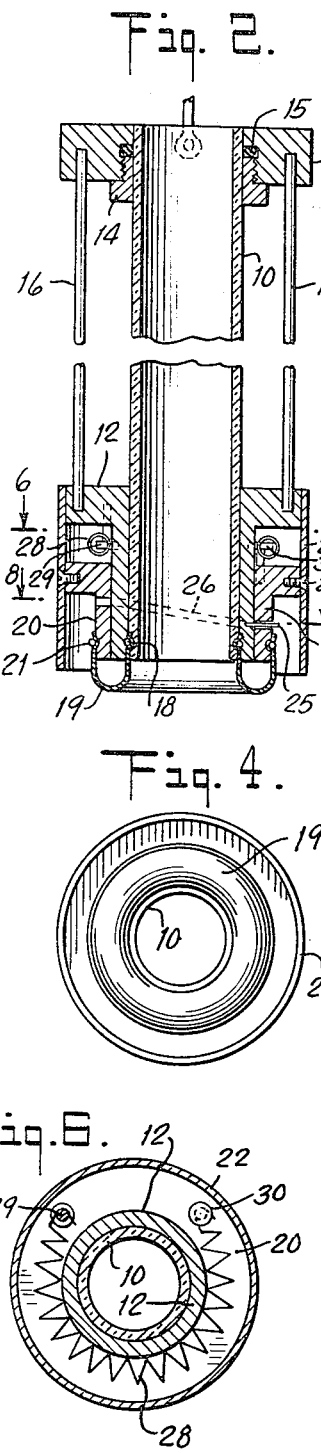
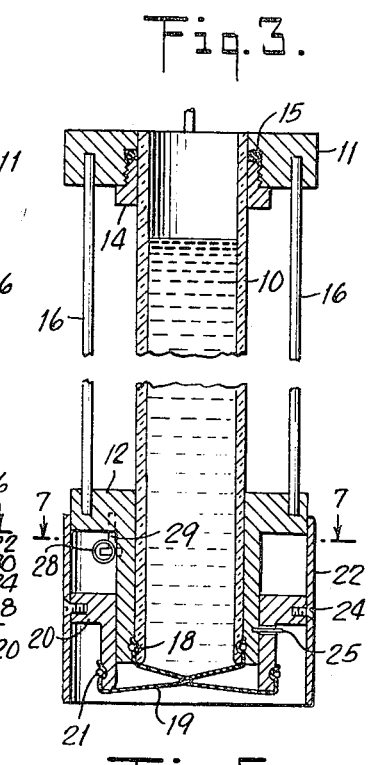
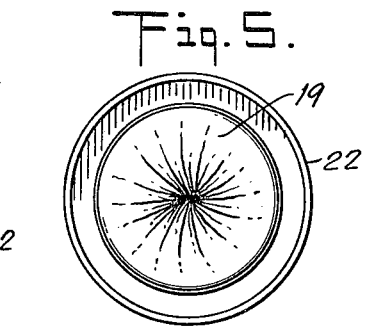
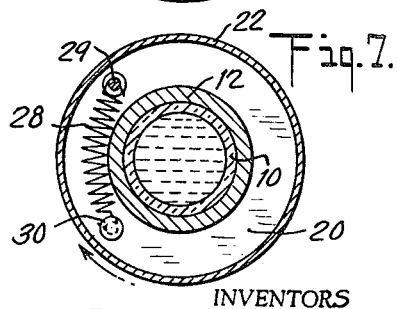
INVENTORS
EDWARD W. KOCH
DAVID C. DORSI
BY
Thomas F. Moran
ATTORNEY

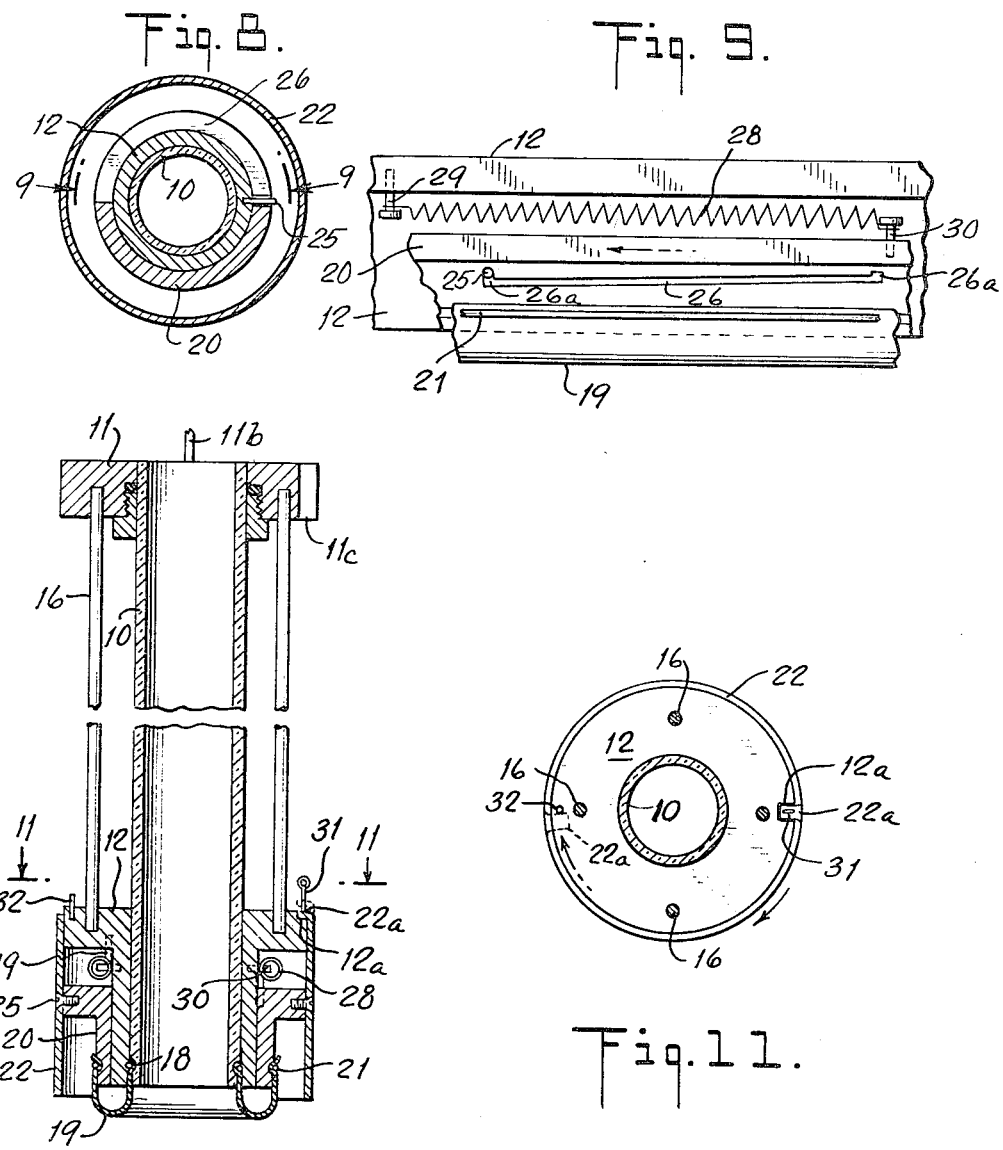

United States Patent Office 3,504,550
Patented Apr. 7, 1970

3,504,550
LIQUID SAMPLER
Edward W. Koch, 28 Polhemus Terrace, Whippany, N.J. 07981, and David C. Dorsi, 240 Morris St., Stirling, N.J. 07980
Filed Apr. 15, 1968, Ser. No. 721,287
Int. Cl. G01n 1/10
U.S. Cl. 73—425.4                                    8 Claims

ABSTRACT OF THE DISCLOSURE

A liquid sampler for obtaining an undisturbed sample of liquid from the bottom of a tank is made up of an open-ended tube. The bottom of the tube contains a spring-loaded diaphragm or iris valve which in the open, untwisted position permits unrestricted flow of the liquid to be sampled into the bottom of the tube through the tube and out of the top of the tube as the sampler is passed downwardly within the fluid to be sampled. Upon contact of the sampler with the bottom of the tank the diaphragm or iris valve is closed. The sampler now containing the sampled liquid is then lifted from the tank.

---

This invention relates to liquid samplers. More particularly, this invention relates to liquid samplers designed to provide a true sample of liquid contained within a tank over a certain vertical distance. In one of its aspects this invention is directed to a device for obtaining an undisturbed sample of liquid from the bottom of a tank.

Liquid sampling devices are known, see U.S. Patents 1,938,224 and 2,001,922. For the most part, however, liquid sampling devices have not been completely satisfactory. For example liquid sampling devices of the type suitable for obtaining an undisturbed sample of tank contents, such as a sample of the bottom layer of a tank, have been cumbersome in operation or expensive in manufacture or not especially effective in obtaining an undisturbed or representative sample. Sampling devices employed heretofore have usually disturbed the liquid to be sampled such that the resulting sample when obtained is not truly representative.

It is an object of this invention to provide a liquid sampling device relatively simple to manufacture.

It is another object of this invention to provide a liquid sampling device which is relatively simple in operation and which is capable of obtaining a representative, substantially undisturbed sample of the tank contents over a predetermined vertical distance.

Still another object of this invention is to provide a liquid sampling device effective upon contact with the bottom of the tank to obtain a representative, substantially undisturbed sample of the bottom layer of the tank contents.

In accordance with at least one embodiment of the practice of this invention at least one of the foregoing objects will be achieved. How these and other objects of this invention are achieved will become apparent in the light of the accompanying disclosure made with reference to the accompanying drawings wherein:

FIG. 1 is an elevational view of the sampling device in accordance with this invention;

FIG. 2 is a fragmentary cross sectional view taken in the direction of arrows 2—2 of FIG. 1 and showing the diaphragm or iris valve at the bottom of the sampling device in the open position;

FIG. 3 is a view similar to FIG. 2 showing the diaphragm or iris valve in the closed position;

FIGS. 4 and 5 are bottom views of the sampling device showing the diaphragm or iris valve of the sampling device in the open and closed position, respectively;

FIGS. 6 and 7 are cross sectional views taken in the direction of arrows 6—6 of FIG. 2 and arrows 7—7 of FIG. 3, respectively;

FIG. 8 is a cross sectional view taken in the direction of arrows 8—8 of FIG. 2;

FIG. 9 is a developed view taken along dashed line 9—9 of FIG. 8;

FIG. 10 is a fragmentary vertical cross sectional view of a sampling device in accordance with another embodiment of this invention; and wherein FIG. 11 is a cross sectional view taken in the direction of arrows 11—11 of FIG. 10.

In accordance with this invention there is provided a liquid sampling device made up of an open-ended tube, the tube preferably being made of transparent material, together with supporting means fixed to the top of the tube for suspending the tube and lowering the tube within the tank to be sampled. Diaphragm or iris valve means is fixed to the other end of the tube around the outside thereof so as to permit undisturbed flow of the liquid contents of the tank being sampled through the tube as the sampling device is lowered within the tank. At a predetermined position within the tank, such as upon contact with the bottom of the tank, the diaphragm or iris valve is actuated so as to close the valve, thereby keeping within the tube a representative, substantially undisturbed sample of the tank contents at the location of the sampling device. The operation of a diaphragm or flexible sleeve iris valve is well known, see U.S. Patent 2,663,467. The sampling device is then lifted from the tank for inspection of its contents.

Referring now to the drawings illustrating various embodiments of the sampling device in accordance with this invention, FIGS. 1, 2 and 3 show an open-ended tube 10, preferably a glass tube, held between internally threaded ring 11 at the top of tube 10 and flanged ring 12 at the bottom of tube 10. Ring 11 is provided with pins 11a which pivotally support yoke 11b relative to ring 11. As illustrated yoke 11b can be hung or suspended from wire or string 13 so that the overall assembly suspended from yoke 11b can be lowered into a tank to be sampled.

Externally threaded clamping ring 14 is threadedly engaged with ring 11 to compress O-ring seal 15 therebetween so as to lock and hold tube 11 in position with respect to ring 11. Rods 16 fixed at the ends thereof into ring 11 and flanged ring 12 impart rigidity to the sampling device and serve to protect tube 10.

Flanged ring 12, as illustrated, is stationary with respect to tube 10 and serves to hold tube 10 by means of O-ring 18 inserted around the inside of the lower end of flanged ring 12. O-ring 18 also serves to hold one portion of flexible diaphragm 19 in fixed position relative to tube 10 and flanged ring 12.

Rotatable flanged sleeve 20 encompasses the lower end of flanged ring 12 and is provided with O-ring 21 which serves to secure and fasten another portion of diaphragm 19 thereto. As illustrated diaphragm 19 depends from O-rings 18 and 21. FIGS. 2 and 4 show diaphragm 19 in the open, untwisted position and FIGS. 3 and 5 show diaphragm 19 in the closed, twisted position.

Skirt 22 extends from the outside of the flanged portion of flanged ring 12 downwardly to a small distance beyond the lower end of rotatable flanged sleeve 20 and is fixed to sleeve 20 by means of screws 24. In effect, skirt 22 and rotatable sleeve 20 are capable of moving as a unit about the lower end of flanged ring 12. At least one pin 25 is fixed to the lower end or cylindrical portion of flanged ring 12 and extends radially therefrom into a slightly inclined slot 26 provided within the cylindrical wall portion or body of sleeve 20. Wells 26a are provided at the ends of slot 26 to receive and to retain pin 25 in locked position unless pin 25 is lifted or moved for well 26a for entrance into slot 26.

Spring 28 is fixed at one end to the flanged portion of flanged ring 12 by means of pin 29 and the other end of spring 28 is fixed to the flanged portion of sleeve 20 by means of pin 30. When spring 28 is in the extended position as illustrated in FIGS. 6, 8 and 9 diaphragm 19 is in the untwisted, open position as illustrated in FIG. 4. In this position pin 25 is located in well 26a of slot 26 as illustrated in FIG. 9. When pin 25 is moved out of well 26a into groove 26 as would occur when the lower end of skirt 22 hits the bottom of the tank to be sampled, thereby vertically displacing sleeve 20 relative to flanged ring 12, sleeve 20 under the urging of spring 28 is rotated about flanged ring 12 and tube 10, thereby twisting and closing diaphragm 19 as illustrated in FIG. 5. If desired, an extension piece or rod, not illustrated, may be fixed to the bottom of skirt 22 so as to actuate skirt 22 and close the diaphragm valve at any desired distance from the bottom of the tank being sampled.

Referring now to FIGS. 10 and 11 which illustrate another embodiment of a liquid sampling device in accordance with this invention, there is illustrated therein a sampling device suitable for taking a representative undisturbed sample from any desired elevation within the tank to be sampled. In accordance with this embodiment skirt 22 is provided with a tooth or flanged portion 22a at the upper end thereof adapted when diaphragm 19 is in the untwisted open position to rest in notch 12a provided in the upper portion of flanged ring 12. Ring pin 31 is fixed to tooth 22a of skirt 22. When the sampling device is lowered into the tank to be sampled at the desired level a string or wire or other suitable means, not illustrated, fixed to ring pin 31 and passing within a guide groove 11c of ring 11 is tugged so as to lift tooth 22a out of notch 12a with the result that skirt 22, together with sleeve 20, is rotated about flanged ring 12 and tube 10 twisting diaphragm 19 to the closed position under the urging of spring 28. The end of travel of tooth 22a and skirt 22 is effected by stop pin 32 fixed to the top of flanged ring 12 in a position to intercept or stop tooth 22a.

As will be apparent to those skilled in the art in the light of the foregoing disclosure, many alterations, changes and substitutions are possible in the practice of this invention without departing from the spirit or scope thereof.

We claim:

1. A liquid sampler comprising an open ended tube, supporting means fixed to one end of the tube for suspending said tube, valve means fixed to the other end of said tube, said valve means being disposed around the outside of said other end of said tube comprising a flexible diaphragm adapted in the open, untwisted position to permit uninterrupted flow of fluid into said other end of said open ended tube and when twisted and closed to seal off the lower end of said tube to contain any liquid therein, wherein one portion of said flexible diaphragm is fixed to the outside of said other end of said tube and another portion of said diaphragm is fixed to a rotatable sleeve adapted for rotation about said other end of said tube, said rotatable sleeve being adapted to be biased for rotation by a spring, one end of said spring being fixed to said sleeve and the other end of said spring being fixed to a stationary positioning member in contact with and surrounding said other end of said tube and positioned intermediate said tube and said rotatable sleeve.

2. A liquid sampler as defined in claim 1 wherein means are provided for twisting and closing said diaphragm to seal off the other end of said tube to contain any liquid therein when said liquid sampler contacts the bottom of a container containing the liquid to be sampled.

3. A liquid sampler as defined in claim 2 in which the means for lifting the tooth out of engagement with the notch is manually controlled.

4. A liquid sampler in accordance with claim 1 wherein means are provided for twisting and closing said diaphragm to seal off the other end of said tube to contain any liquid therein at any selected depth in the container containing the liquid to be sampled.

5. A liquid sampler as defined in claim 4 in which said stationary member is provided with a notch and said rotatable member is provided with a tooth engageable in said notch when the sleeve is in an open untwisted position; and means are provided for lifting the tooth out of engagement with the notch so as to permit the spring to urge the rotatable member to rotate the diaphragm to closed position.

6. A liquid sampler as defined in claim 5 in which means are provided on the stationary member for engaging the tooth to arrest the rotational improvement of the sleeve when the diaphragm reaches the closed or twisted position.

7. A liquid sampler comprising an open ended tube, supporting means fixed to one end of the tube for suspending said tube, valve means fixed to the other end of said tube, said valve means being disposed around the outside of said other end of said tube comprising a flexible diaphragm adapted in the open, untwisted position to permit uninterrupted flow of fluid into said other end of said open ended tube and when twisted and closed to seal off the lower end of said tube to contain any liquid therein, wherein one portion of said flexible diaphragm is fixed to the outside of said other end of said tube and another portion of said diaphragm is fixed to a rotatable sleeve adapted to be biased for rotation by a spring, one end of said spring being fixed to said sleeve and the other end of said spring being fixed to a stationary positioning member in contact with and surrounding said other end of said tube and positioned intermediate said tube and said rotatable sleeve, said positioning member being provided with at least one pin and said rotatable sleeve being provided with at least one groove, said pin extending into said groove and said pin and said groove cooperating to guide said rotatable sleeve as it is moved about said stationary positioning member on the action of said spring.

8. A liquid sampler in accordance with claim 7 wherein said groove is provided with a well at each end thereof for locking said pin in position relative to said groove such that when said pin is in said well said flexible diaphragm is in the open, untwisted position or the closed, twisted position.

References Cited

UNITED STATES PATENTS

| 2,893,691 | 7/1959 | Johnson | 73—425 XR |
|---|---|---|---|
| 3,123,262 | 3/1964 | Douglass | 222—507 |
| 3,188,070 | 6/1965 | Lee | 251—4 XR |
| 3,383,131 | 5/1968 | Rosfelder | 73—421 XR |

FOREIGN PATENTS

| 1,236,242 | 3/1967 | Germany. |
|---|---|---|

LOUIS R. PRINCE, Primary Examiner

H. C. POST III, Assistant Examiner